(12) United States Patent
Jiang et al.

(10) Patent No.: US 12,482,177 B2
(45) Date of Patent: Nov. 25, 2025

(54) IMPLEMENTING MULTIPLE THREAD SCENES IN VIRTUALIZED METAVERSE

(71) Applicant: INTERNATIONAL BUSINESS MACHINES CORPORATION, Armonk, NY (US)

(72) Inventors: Peng Hui Jiang, Beijing (CN); Jun Su, Beijing (CN); Su Liu, Austin, TX (US); Guang Han Sui, Beijing (CN); Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 18/318,692

(22) Filed: May 16, 2023

(65) Prior Publication Data

US 2024/0386660 A1 Nov. 21, 2024

(51) Int. Cl.
*G06T 17/00* (2006.01)
(52) U.S. Cl.
CPC .................................. *G06T 17/00* (2013.01)
(58) Field of Classification Search
None
See application file for complete search history.

(56) References Cited

U.S. PATENT DOCUMENTS

| 8,850,342 | B2 | 9/2014 | Deluca et al. |
| 8,947,431 | B2 | 2/2015 | Li et al. |
| 9,616,338 | B1 | 4/2017 | Hooper et al. |
| 9,626,799 | B2 | 4/2017 | McCardle et al. |
| 10,636,220 | B2 | 4/2020 | Gervasio et al. |
| 11,023,095 | B2 | 6/2021 | Ziman |
| 2021/0291042 | A1* | 9/2021 | Shuster .................. G06T 13/40 |
| 2024/0281052 | A1* | 8/2024 | Le Chevalier .......... G06F 3/011 |

FOREIGN PATENT DOCUMENTS

| CN | 102036106 B | 2/2014 |
| CN | 107045550 A | 4/2017 |
| IN | 202241050053 A | 9/2022 |

OTHER PUBLICATIONS

Bye, et al., Multi-Threaded Immersive Theater Experience, Retrieved from: https://vrjam.devpost.com/submissions/36936-crossover-multi-threaded-immersive-theater-experience, Apr. 20, 2015, 9 pages.
Prabhu, J., Enabling Together Mode in MS Teams, Retrieved from: https://techcommunity.microsoft.com/t5/microsoft-teams/enabling-together-mode-in-ms-teams/m-p/1698285, Sep. 22, 2020, 5 pages.

* cited by examiner

*Primary Examiner* — Peter Hoang
(74) *Attorney, Agent, or Firm* — Lily Neff

(57) ABSTRACT

Various embodiments are provided herein for implementing multiple thread scenes in a computing environment virtualized metaverse. A multi-layered thread to be instanced in the virtualized metaverse is developed. A main thread scene, and a virtualized avatar that is projected in the main thread scene, is developed. The creation and merger of the main thread scene with other thread scenes featuring the virtualized avatar throughout the multi-layered thread according to a predetermined methodology or overall theme, is enabled.

20 Claims, 7 Drawing Sheets

IMPLEMENTING MULTIPLE THREAD SCENES IN VIRTUALIZED METAVERSE

BACKGROUND

The present invention relates in general to computing systems, and more particularly, to various embodiments for configuring, building, implementing, and using multiple thread scenes in a virtualized metaverse in a computing environment.

SUMMARY

According to an embodiment of the present invention, a method for implementing multiple thread scenes in a computing environment virtualized metaverse, by one or more processor devices, is provided. A multi-layered thread to instance in the virtualized metaverse, is developed. A main thread scene, and a virtualized avatar that is projected in the main thread scene, is developed. The creation and merger of the main thread scene with other thread scenes featuring the virtualized avatar throughout the multi-layered thread according to a predetermined methodology or overall theme, is enabled.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

DETAILED DESCRIPTION OF THE DRAWINGS

Figure 1:
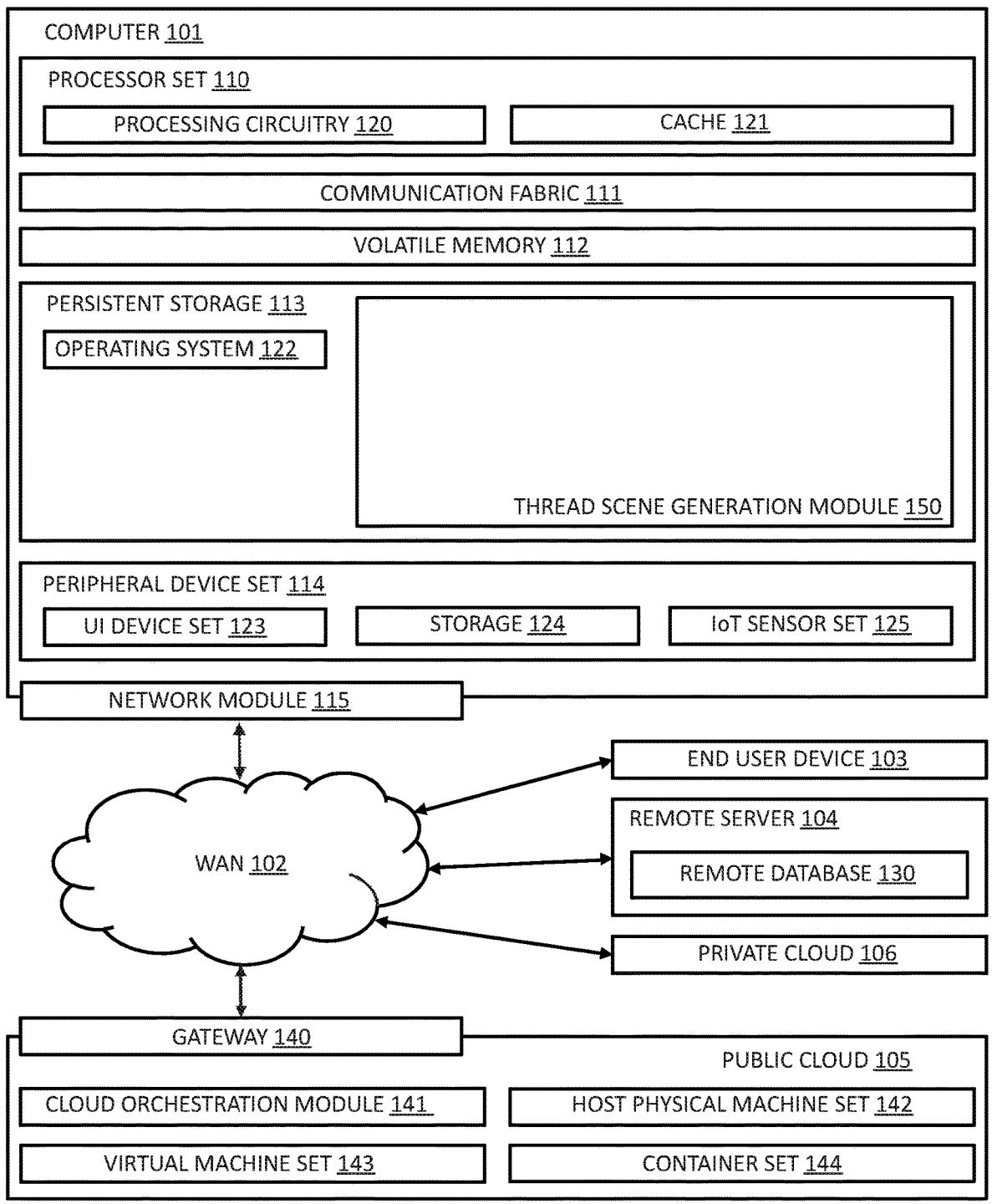
FIG. 1 is a block diagram depicting an exemplary cloud computing node according to an embodiment of the present invention.

The so-called "metaverse," or "Metaverse" is a shared, decentralized, and digital space that exists beyond the real world. It may be experience through virtual reality (VR) or augmented reality (AR). The metaverse is a virtualized location where humans and other objects in the real world can co-exist in digital forms, in similar fashion to how humans and other objects can exist physically in our own world. People are able to design a particular environment of the metaverse by ourselves, so that this environment will be unique to each person who visits that environment.

The metaverse is rapidly becoming reality; and accordingly, the metaverse may have significant implications on both human existence and our relationship with technology. As the metaverse differs in many aspects, it is advantageous for people to be afforded multiple ways to think, work, live, communicate, and travel in the metaverse.

In addition, it is advantageous for people to have the ability to access different "threads" or "layers" within their metaverse, in order to fully benefit from the differences and advantages that a personalized metaverse offers an individual that differs from the real world. Accordingly, there is work left to accomplish before individuals are fully equipped and capable, using metaverse tools, to fully enter and realize a different "dimension" and other aspects and benefits of their own virtualized metaverse.

To assist in enabling individual users within a metaverse to fully enjoy a multi-layered and virtualized experience in accordance with what the metaverse can fully offer a user, the mechanisms the present invention present various methods for enabling, creating, and leveraging various aspects of multiple abstraction layers within and around a virtualized metaverse that is customed for a particular user. The mechanisms of the present invention do so by instancing these aspects within a set of multiple "thread scenes" within a virtualized metaverse as follows:

First the mechanisms of the illustrated embodiments collect the scene in question from data obtained from the real world, and then leverage this data to build a so-called "main thread layer" in the virtualized metaverse. A request from a particular avatar enabled within the main thread layer requests, and the mechanisms of the illustrated embodiments respond, with a so-called "side branch layer" along with the main thread layer.

In an exemplary next step, the scene is duplicated and a projection of other avatars from the main thread layer is duplicated to construct the side branch/thread layer to allow the avatar to work on the side thread layer. The projection of the avatar is delegated to present in the main thread layer, for example. In one embodiment, the projection of avatar may function as a digital "stand-in," collecting and summarizing information from the main thread layer, or interacting with other avatars.

In a further exemplary step, in response to an additional request, the mechanisms of the illustrated embodiments may build a nested side branch (i.e., nested side branch layer) to allow the avatar to work in extended content. In response to the request from the avatar, the side thread layer or branch thread layer may be merged back to the main thread in the main thread layer. If a conflict between branch layers occurs, the conflict may be resolved between multiple branch thread layers by merging content, for example, to allow the avatar to return back to the main branch/thread layer.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as may be used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning scheduling agent benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations, schedules, PE's, and/or machine learning models/machine learning pipelines, but there may be a variety of factors that may result in alternate suggestion of a combination of operations, schedules, PE's, and/or machine learning models/machine learning pipelines yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code for acceleration of inflight deployments by thread scene generation module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
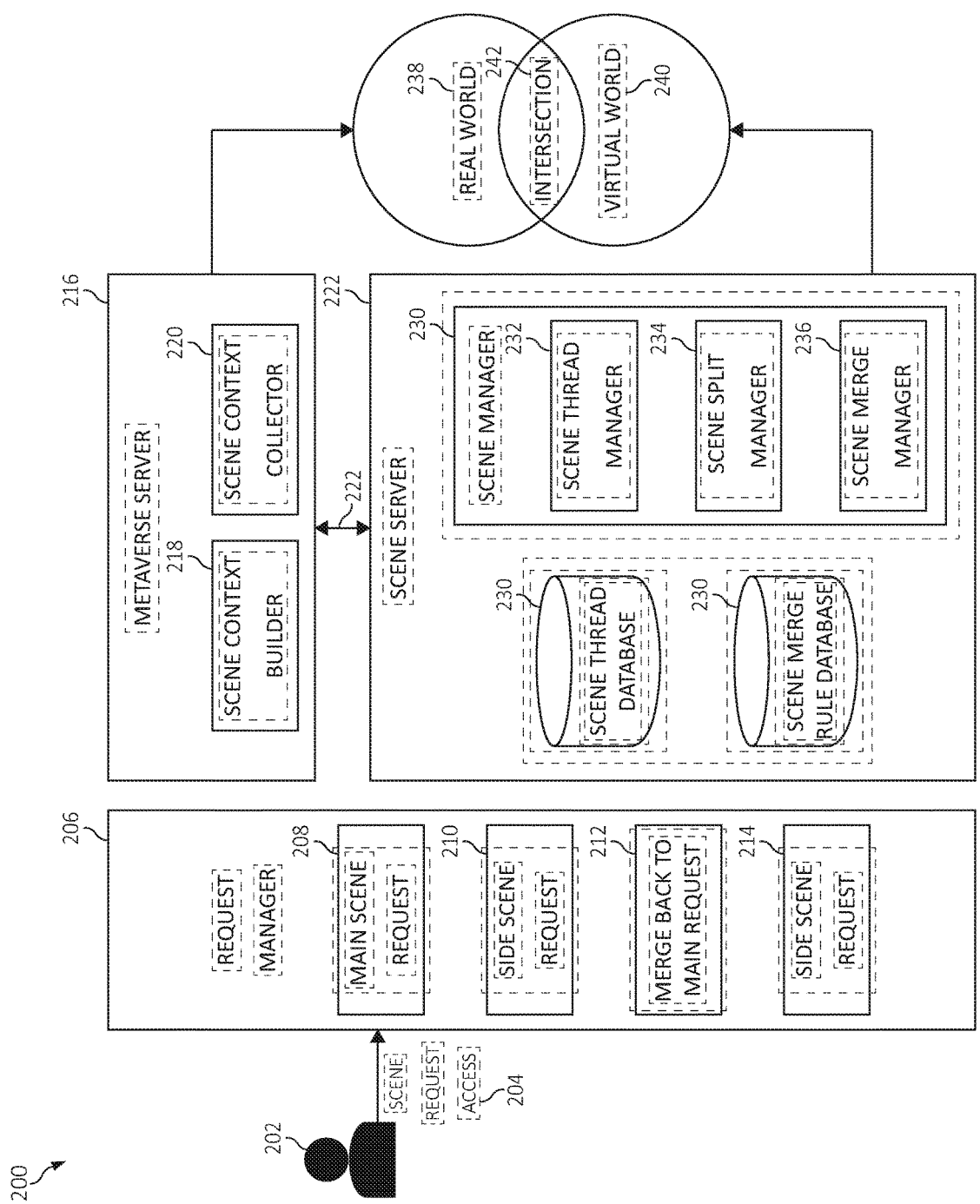
FIG. 2 is an additional block diagram depicting an exemplary cloud computing architecture, in which embodiments of the present invention may be implemented.

Turning now to FIG. 2, a block diagram of exemplary computing system architecture 200 is depicted. Architecture 200 incorporates request manager 206, metaverse server 216, and scene server 230 architectures as shown. The depicted embodiment of architecture 200 may be implemented by hardware, firmware, software, or a combination thereof as previously described, for example, as in FIG. 1 previously.

An individual user 202 is depicted. The user 202 will be later virtualized as an avatar 202 in the metaverse as will be described. As a result, the terms "user" and "avatar" may be used to describe the user 202 as they find themselves in the real world, and as avatar 202 as they find themselves in the virtualized metaverse.

As will be described, further, in an example of the foregoing functionality as will be shown according to the present invention, the user 202 as avatar 202 leverages scene request access command/credentials 204 to the request manager 206 to make a main scene request 208 as depicted. In addition to the aforementioned main scene request 208, the request manager 206 may make subsequent side scene request 210, a merge back to main request 212, and a side scene request 214. Of course, one of ordinary skill in the at will appreciate that the request manager 206 may implement other related requests that are not shown.

Request manager 206 may operate in conjunction with metaverse server 216 and scene server 224 (as represented, for example, by intercommunication bidirectional arrow 222). Metaverse server 216 is shown incorporating scene context builder 218, which incorporates various hardware, software, or similar functionality to implement various contexts around a specific scene. Similarly, scene context collector 220 also implements similar functionality in the design, creation, and instantiation of scene context.

Metaverse server may request or provide scene context and other information through scene manager 230. Scene manager 230 may incorporate various individual scene thread managers 232, 234, and 236 as depicted. Accordingly, additional thread managers for specific threads that are not shown.

Scene server 224, in addition to scene manager 230, may implement various databases, such as scene thread database 226 and scene merge rule database 228. Scene thread database 226 may contain various data that is implemented in the virtualization of a particular scene thread as one of ordinary skill in the art will appreciate. Similarly, scene merge rule database 228 may contain various data that is implemented for merging particular virtualized scene threads according to a particular request manager 206. Additional similar functionality may also be appreciated by one of ordinary skill in the art.

Architecture 200, implementing request manager 206, metaverse server 216, and scene server 224, among other components, operates, for example to virtualize avatar 202, various thread scenes, including thread context and other thread data in virtual world 240 as shown. Real world 238 is shown as depicted. An objective of architecture 200, including those of the methods as will be further described of the present invention, is to enable the virtual world 240, and yet strategically enable to create a meaningful intersection 242 of the virtual world 240 and real world 238 according to the individual aspects set forth by avatar 202 and thereby, user 202 in the real world.

Figure 3:
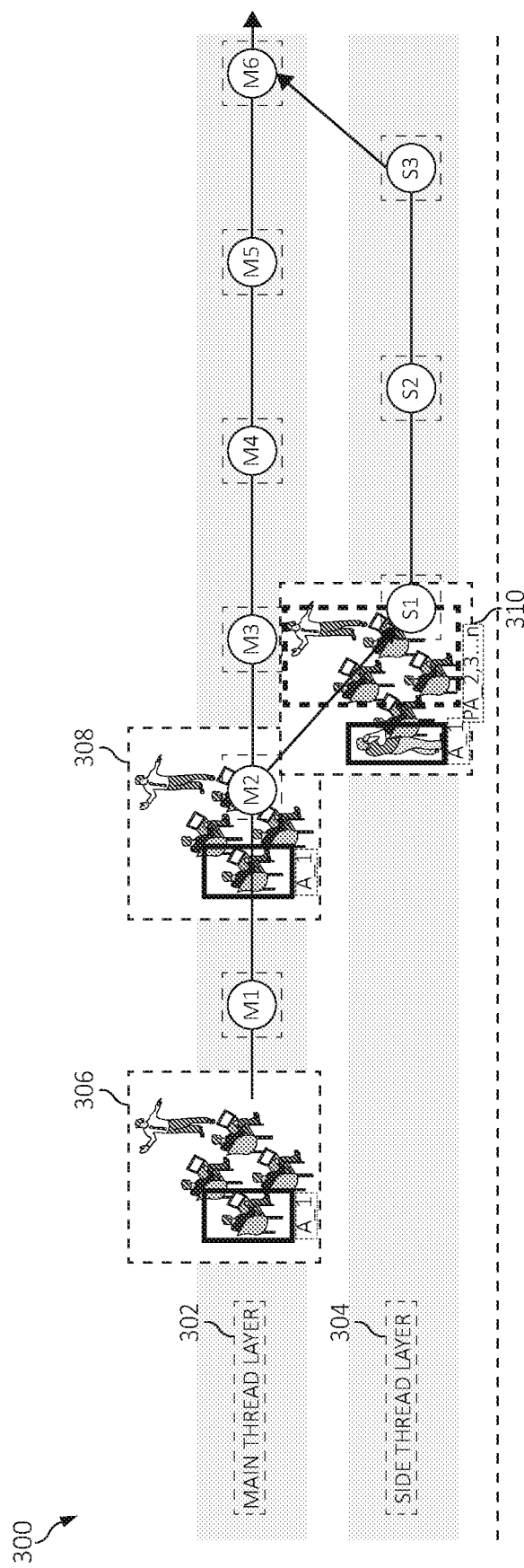
FIG. 3 is an additional block/flow diagram depicting an exemplary realization of multiple abstraction thread layers in a virtualized metaverse, according to an embodiment of the present invention.

Turning now to FIG. 3, a block/flow diagram of an exemplary implementation 300 of various abstracted and virtualized thread layers is depicted in accordance with an embodiment of the present invention. As depicted, implementation 300 features a main thread layer 302, and a side thread layer 304 as shown. A virtualization incorporating an avatar A_1 is depicted as shown.

As one of ordinary skill in the art will appreciate, the main thread layer 302 and side thread layer 304 are instantiated in a customized, virtualized metaverse for the avatar A_1. In this metaverse, the main thread of the depicted scenes may be a typical metaverse meeting room, which is the projected scene 306 derived from the real world, and built as previously mentioned in main thread layer 302.

The avatar A_1 may request a side thread layer 304 simultaneously, which in one embodiment, duplicates the projected scene 306. So while main thread layer proceeds through timelines M1, M2, M3, M4, M5, and so on, side thread layer also proceeds through timelines S1, S3, S3, etc. In the depicted embodiment, projection 306 becomes, with the addition of additional thread context, projection 308 at M2. At approximately M3, projection 308 incorporates various projections of other avatars (e.g., PA_1, 2, 3 . . . n) in side thread layer 304 as projection 310.

As shown in implementation 300, the avatar A_1, as a reflection of consciousness in the real world, can perform work on the side thread layer 304, for example, experimental scene-sharing technology, but leave the projection of avatar A_1 (PA_1) in the main thread layer 302 as shown. Furthermore, utilizing techniques derived from Artificial Intelligence (AI), the PA_1 may be enabled to present in the main thread layer 302 at approximately M2 on behalf of the avatar A_1, functioning as a digital character, collecting and summarizing information from the scene (e.g., either or/and scenes 306, 308, 310, or other scenes/projections), or interacting with other avatars (e.g., A_2,3 . . . n) in the main thread layer 302 by leveraging NLP, Chat-bot functions, or by implementing other functionality as would be apparent to one of ordinary skill in the art.

Figure 4:
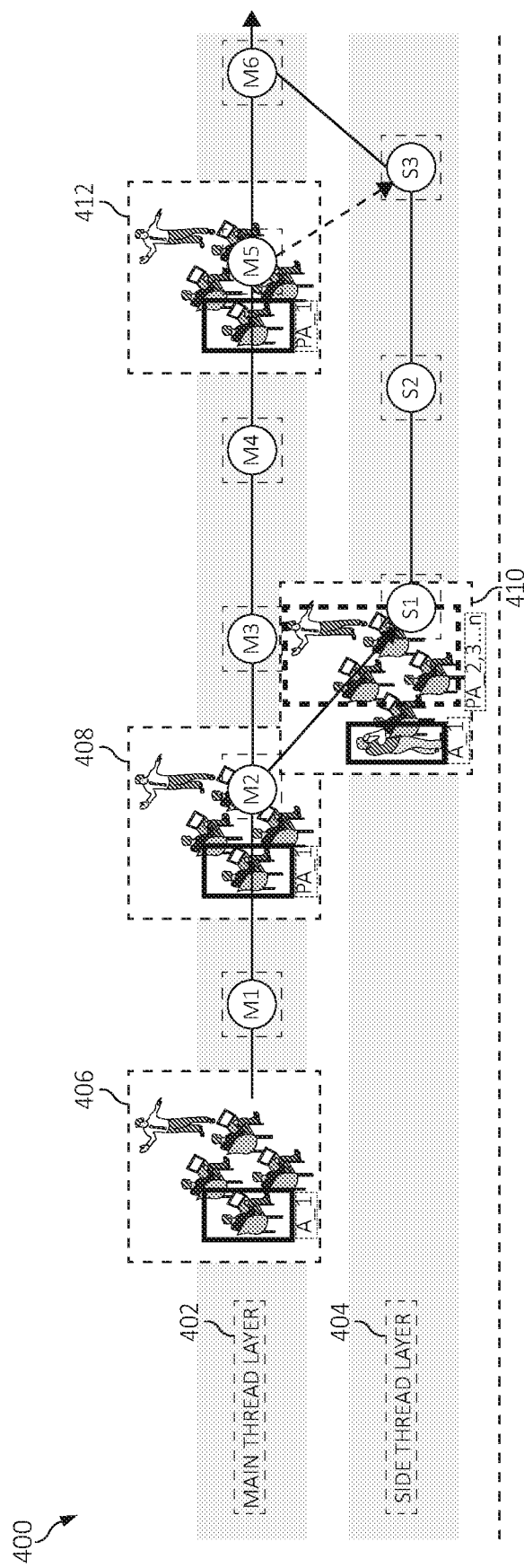
FIG. 4 is an additional block/flow diagram depicting an additional exemplary realization of multiple abstraction thread layers in a virtualized metaverse, according to an embodiment of the present invention.

Turning now to FIG. 4, which depicts exemplary implementation 400 as shown and continuing the functionality as previously described, in the side thread layer 404 (S1), the avatar A_1 may interact with the projections of other avatars (PA_2,3, . . . n) or avatars in an experimental scene-sharing environment in order to test possible communication or reactions with other avatars' "stand-in." For example, in the depicted implementation 400 of a virtualized metaverse meeting, in a similar way to a so-called "breakout session" from a real-world conference, avatars can virtually exchange information and opinions in the side thread layer 404.

Additionally, in the side thread layer at approximately timeline S3, the avatar A_1 may actively terminate the side thread layer 404 to return to the main thread layer 402, and from the main thread layer 402 pickup key information collected and summarized by the projection of avatar A_1 (PA_1), thereby successfully completing multiple thread scenes. Finally, the avatar A_1 in the side thread layer 404 at approximately timeline S3, may also be passively recalled by PA_1 from the main thread layer 402 at approximately timeline M5, when a predefined condition or scenario is triggered and/or realized. For example, some situation that may not be easily handled by the projection of avatar A_1 (PA_1) may trigger the aforementioned predefined situation.

Figure 5:
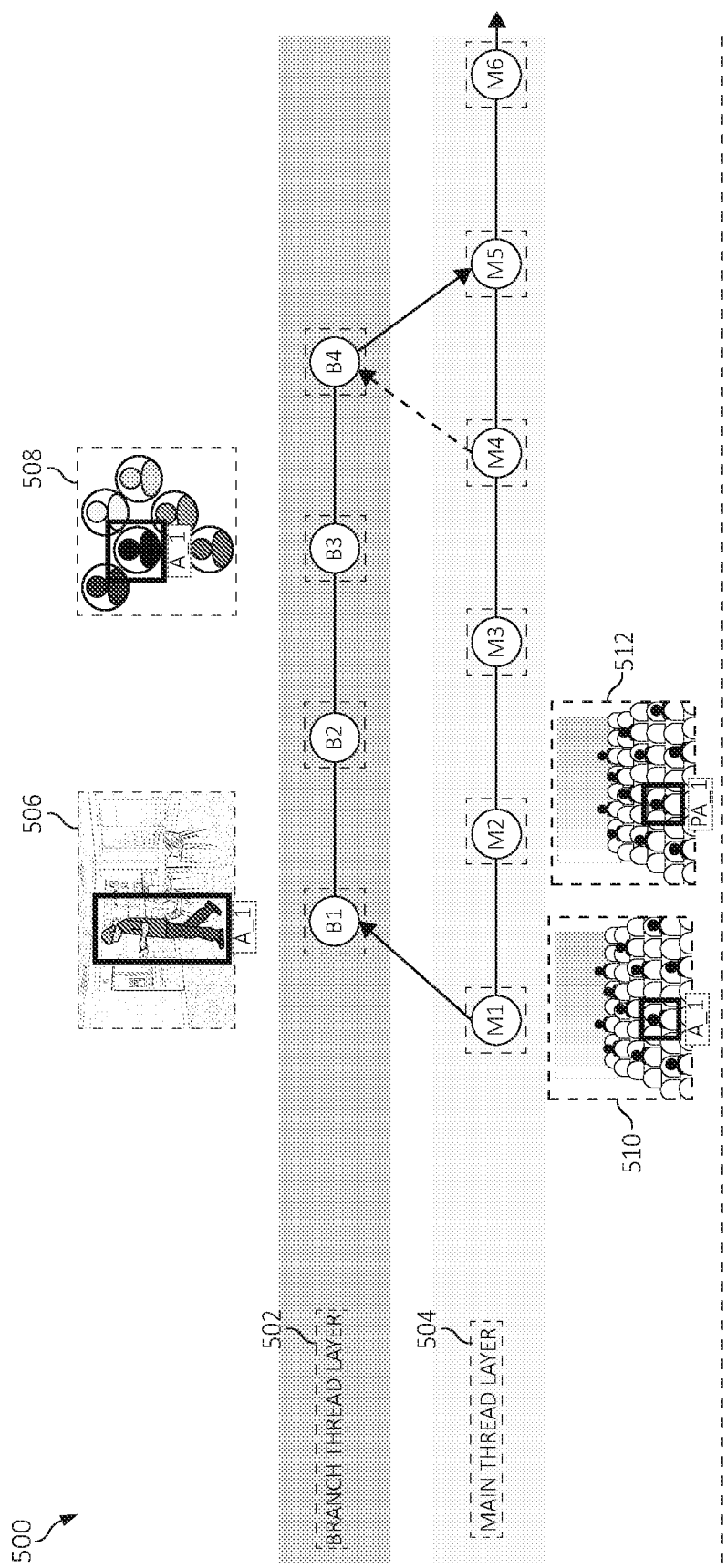
FIG. 5 is an additional block/flow diagram depicting an additional exemplary realization of multiple abstraction thread layers in a virtualized metaverse, according to an embodiment of the present invention.

Turning now to FIG. 5, which depicts implementation 500 in a separate embodiment according to the mechanisms of the present invention, a branch thread layer 502 is instantiated alongside main thread layer 504 as shown. Avatar A_1 is again shown in various projections 506, 508, and 510. Projection of avatar A_1 (PA_1) is also shown as part of the projection 512.

In the depicted implementation 500 that projects a virtualized metaverse conference, each thread layer may represent a typical conference scene as found in the real world. For example, the main thread layer 504 may be the "theater" (as virtualized) hosing the keynote speech, while a branch thread layer 502 may be the "lobby" (as virtualized) for building a social network.

As one of ordinary skill in the art will appreciate. With various events (as virtualized into various projections and accordingly, various virtualizations of the real world may transpire in simultaneous or near-simultaneous occurrence. Avatar A_1 has the capability of switching from the main thread layer 504 to branch thread layer 502, leaving the projection of avatar A_1 (PA_1) in the main thread layer 504 as avatar A_1's stand-in. Finally PA_1 may collect and summarize information from the main scene (e.g., main thread layer 502), by leveraging NLP and CHAT-bot functions, etc., while A_1 enjoys the social network in the branch thread layer 502, which again virtualizes the conference lobby.

Figure 6:
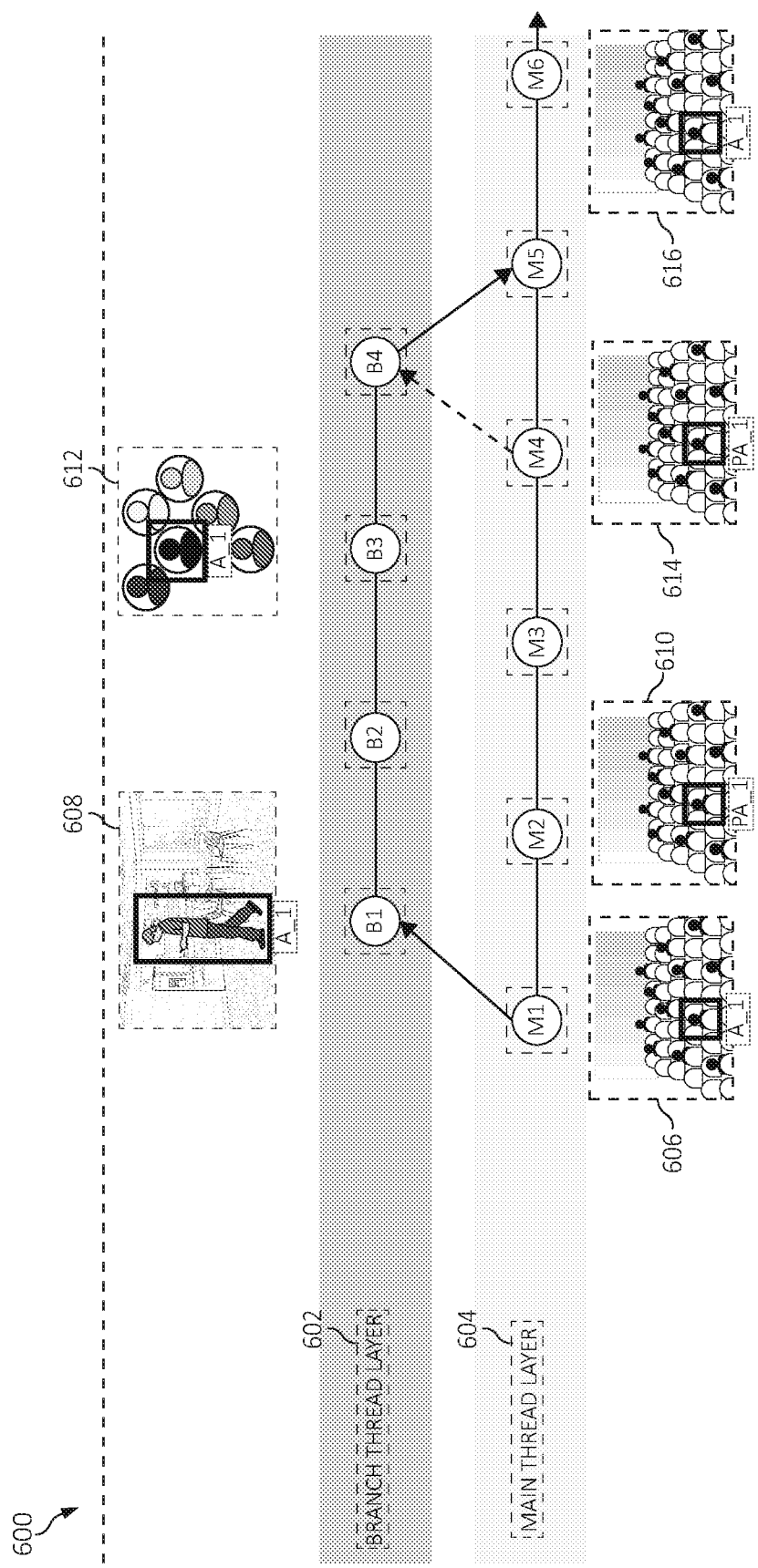
FIG. 6 is an additional block/flow diagram depicting an additional exemplary realization of multiple abstraction thread layers in a virtualized metaverse, according to an embodiment of the present invention.

FIG. 6, following, depicts an additional exemplary implementation 600 in accordance with various aspects of the present invention. Implementation 600 features a main thread layer 604, and branch thread layer 602, in similar fashion to that described in FIG. 5, previously. Additionally, various projections 606, 608, 610, 612, 614, and 616 are depicted, featuring avatar A_1, and projection of avatar A_1 (PA_1) as shown.

In one exemplary embodiment, again involving a virtualized metaverse conference, in the branch thread layer 602, the avatar A_1 may actively terminate the branch thread layer 602 to return back to the main thread layer 604 at approximately M5, and from the main thread layer 604, pickup key information and context summarized by the projection of avatar A_1 (PA_1), successfully complete multiple thread scenes.

The avatar A_1 in the branch thread layer 602 may also be passively called back by PA_1 from the main thread layer at approximately M4, when the triggering of a predefined situation occurs. For example, the predetermined situation may be triggered when a topic that the user/avatar A_1 finds interesting, is presented.

To summarize thus far, the mechanisms of the illustrated embodiments allow the generation of multiple scenes in a personalized metaverse. The mechanisms provide ease of management of varying evolutionary stages of metaverse scenes. Further, the avatar is allowed to bring context and other information to a side branch layer to enjoy differing metaverse experiences. Finally, the avatars are allowed to return back to the main threat layer to synchronize with the real world.

Figure 7:
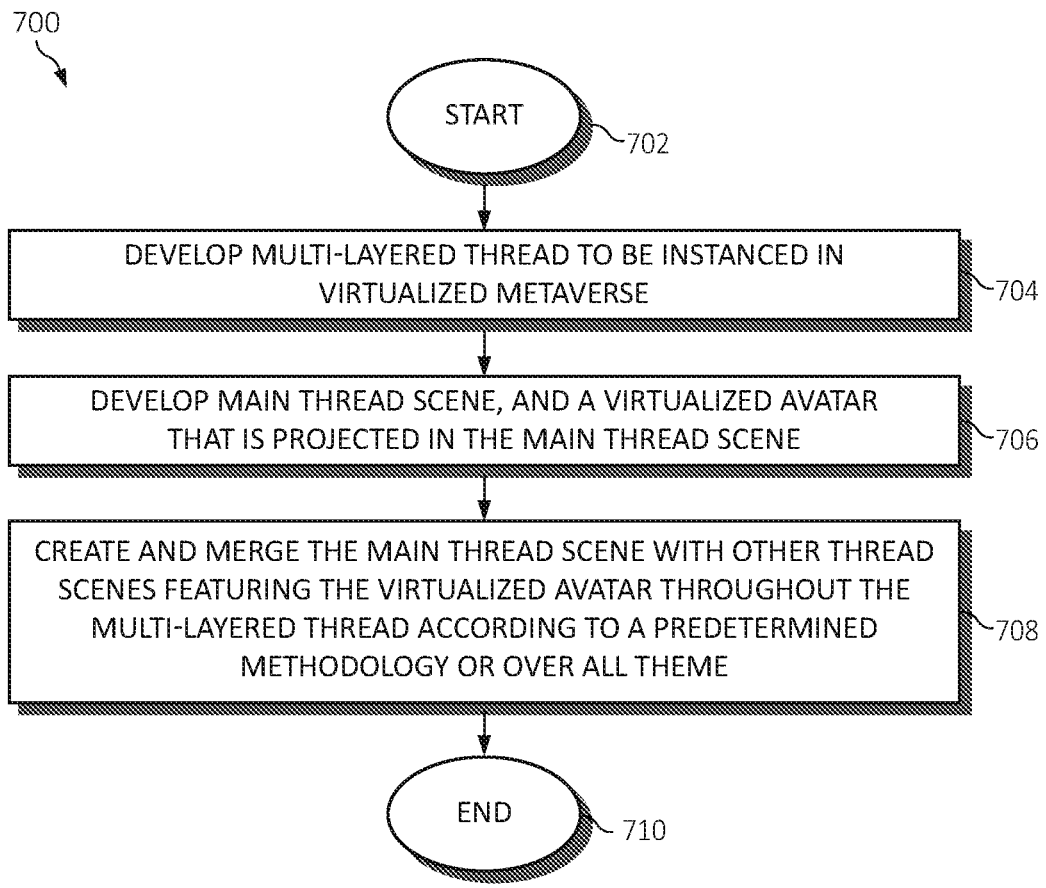
FIG. 7 is a flow chart diagram of an exemplary method for implementing multiple thread scenes in a computing environment virtualized metaverse, according to an embodiment of the present invention.

FIG. 7, following, is a flow chart diagram that depicts an exemplary method (method 700) for implementing multiple thread scenes in a computing environment virtualized metaverse, according to an embodiment of the present invention. Method 700 reflects exemplary functionality for creating, building, and instancing a personalized metaverse for a user in the manner the user sees fit, providing the intersection necessary between the real world and virtualized world as previously described.

As a first step, method 700 begins (step 702). A multi-layered thread is developed to be instanced in the virtualized metaverse (step 704). A multi-layered thread is developed to be instanced in the virtualized metaverse in step 704. In Step 706, following, a main thread scene as previously described, is developed, and a virtualized avatar that is projected in the main thread scene, is developed. In step 708, following, the creation and merger of the main thread is undertaken, where the main thread scene is merged with other thread scenes featuring the virtualized avatar throughout the multi-layered thread according to a predetermined methodology or overall theme. In step 710, the method 700 then ends.

It should be noted that, as used herein, the terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

We claim:

1. A computer-implemented method for implementing multiple thread scenes in a computing environment virtualized metaverse, by one or more processor devices, comprising:
    developing a multi-layered thread to be instanced in the virtualized metaverse, by obtaining images (scenes) from one or more real objects;
    developing a main thread scene, and a first avatar that is virtualized and projected in the main thread scene;
    duplicating the main thread scene and creating a projection of the first avatar to allow the avatar to work on a specific task on a side thread layer;
    delegating the projection of the first avatar to present in the main thread scene so that the projection of functions of the first avatar as digital stand-in, collecting and summarizing information and performing other tasks from the main thread scene;
    creating additional avatars to generate nested side branches to allow each additional avatar to work on different tasks in an extended context;
    responding a request from the first avatar to merge side thread layer or branch thread layer back to the main thread; and
    enabling a creation and merger of the main thread scene using the first avatar by including tasks completed and information gathered by additional avatars with other thread scenes featuring the virtualized avatar throughout the multi-layered thread according to a predetermined methodology or overall theme.

2. The computer-implemented method of claim 1, further comprising responding to a request from the first avatar to create the main thread scene in a main thread layer, and create the other thread scenes that are virtualized as a branch or side thread layer from the main thread scene in a side thread layer.

3. The computer-implemented method of claim 2, further comprising duplicating the main thread scene of the main thread layer, and creating a derivative projection of the first avatar to be shown on the side thread layer.

4. The method of claim 1, wherein developing the main thread scene and the first avatar further comprises building the avatar as a reflection of a user's profile and selected characteristics that is present in a physical world.

5. The method of claim 1, further comprising:
    enabling a projection of the first avatar to function as a digital stand-in, collecting and summarizing information from the main thread scene as a main thread layer, or to function and interact with other avatars in the other thread scenes as other thread layers in the multi-layered thread,
    enabling, in one of the other thread scenes functioning as a side thread layer of the multi-layered thread, a projection of the first avatar to interact with projections of the other avatars in an experimental scene-sharing theme to test a communication methodology or a reaction with the avatar or the other avatars,
    in the side thread layer, actively terminating, by the avatar, the side thread theme to return to the main thread theme in the main thread layer, and collecting information summarized by the avatar to successfully complete multiple thread scenes according to the predetermined methodology.

6. The method of claim 1, further comprising:
    calling back, by a projection of the first avatar in the main thread scene as a main thread layer, a further projection of the avatar in one of the other thread scenes functioning as a side thread scene in a side thread layer by a predetermined condition being satisfied in the predetermined methodology.

7. The method of claim 1, wherein enabling the creation and merger of the main thread scene with the other thread scenes featuring the virtualized avatar throughout the multi-layered thread further comprises:
    responding to an additional request by the first avatar to build a nested branch thread layer as one of the multi-layered thread, or
    responding to the additional request by the first avatar to merge the nested branch thread layer with the main thread scene as a main thread layer, or resolving a conflict, or merging a context in multiple ones of the other thread scenes and other thread layers to allow the other avatar to return to the main thread scene as the main thread layer.

8. A system for implementing multiple thread scenes in a computing environment virtualized metaverse, comprising:
one or more computers with executable instructions that when executed cause the system to:
develop a multi-layered thread to be instanced in the virtualized metaverse, by obtaining images (scenes) from one or more real objects;
develop a main thread scene, and a first avatar that is virtualized and projected in the main thread scene;
duplicate the main thread scene and creating a projection of the first avatar to allow the avatar to work on a specific task on a side thread layer;
delegate the projection of the first avatar to present in the main thread scene so that the projection of function of the first avatar as digital stand-in, collecting and summarizing information and performing other tasks from the main thread scene;
create additional avatars to generate nested side branches to allow each additional avatar to work on different tasks in an extended context;
respond a request from the first avatar to merge side thread layer or branch thread layer back to the main thread; and
enable creation and merger of the main thread scene using the first avatar by including tasks completed and information gathered by additional avatars with other thread scenes featuring the virtualized avatar throughout the multi-layered thread according to a predetermined methodology or overall theme.

9. The system of claim 8, further comprising executable instructions that when executed cause the system to:
respond to a request from the first avatar to create the main thread scene in a main thread layer, and
create the other thread scenes that are virtualized as a branch or side thread layer from the main thread scene in a side thread layer.

10. The system of claim 9, further comprising executable instructions that when executed cause the system to duplicate the main thread scene of the main thread layer and create a derivative projection of the first avatar, both the duplicate of the main thread scene and the derivative projection shown on the side thread layer.

11. The system of claim 8, wherein developing the main thread scene and the first avatar further comprises building the avatar as a reflection of a user's profile and selected characteristics that is present in a physical world.

12. The system of claim 8, further comprising executable instructions that when executed cause the system to:
enable a projection of the first avatar to function as a digital stand-in, collecting and summarizing information from the main thread scene as a main thread layer, or to function and interact with other avatars in the other thread scenes as other thread layers in the multi-layered thread,
enable, in one of the other thread scenes functioning as a side thread layer of the multi-layered thread, a projection of the first avatar to interact with projections of the other avatars in an experimental scene-sharing theme to test a communication methodology or a reaction with the avatar or the other avatars,
in the side thread layer, actively terminate, by the avatar, the side thread theme to return to the main thread theme in the main thread layer, and collect information summarized by the avatar to successfully complete multiple thread scenes according to the predetermined methodology.

13. The system of claim 8, further comprising executable instructions that when executed cause the system to call back, by a projection of the first avatar in the main thread scene as a main thread layer, a further projection of the first avatar in one of the other thread scenes functioning as a side thread scene in a side thread layer by a predetermined condition being satisfied in the predetermined methodology.

14. The system of claim 8, further comprising executable instructions that when executed cause the system to, pursuant to enabling the creation and merger of the main thread scene with the other thread scenes featuring the virtualized avatar throughout the multi-layered thread:
respond to an additional request by the first avatar to build a nested branch thread layer as one of the multi-layered thread,
respond to the additional request by the first avatar to merge the nested branch thread layer with the main thread scene as a main thread layer, or
resolve a conflict, or merge a context in multiple ones of the other thread scenes and other thread layers to allow the avatar to return to the main thread scene as the main thread layer.

15. A computer program product for implementing multiple thread scenes in a computing environment virtualized metaverse, the computer program product comprising:
one or more computer readable storage media, and program instructions collectively stored on the one or more computer readable storage media, the program instruction comprising:
program instructions for developing a multi-layered thread to be instanced in the virtualized metaverse by obtaining images (scenes) from one or more real objects;
program instructions for developing a main thread scene, and a first avatar that is virtualized and projected in the main thread scene,
program instructions for duplicating the main thread scene and creating a projection of the first avatar to allow the first avatar to work on a specific task on a side thread layer;
program instructions for delegating the projection of the first avatar to present in the main thread scene so that the projection of functions of the first avatar as digital stand-in, collecting and summarizing information and performing other tasks from the main thread scene;
program instructions for creating additional avatars to generate nested side branches to allow each additional avatar to work on different tasks in an extended context;
program instructions for responding a request from the first avatar to merge side thread layer or branch thread layer back to the main thread; and
program instructions for enabling a creation and merger of the main thread scene using the first avatar by including tasks completed and information gathered by additional avatars with other thread scenes featuring the virtualized avatar throughout the multi-layered thread according to a predetermined methodology or overall theme.

16. The computer program product of claim 15, further comprising program instructions for:
responding to a request from the first avatar to create the main thread scene in a main thread layer, and creating the other thread scenes that are virtualized as a branch or side thread layer from the main thread scene in a side thread layer.

17. The computer program product of claim 16, further comprising program instructions for duplicating the main thread scene of the main thread layer and creating a derivative projection of the first avatar, both the duplicate of the main thread scene and the derivative projection shown on the side thread layer.

18. The computer program product of claim 15, further comprising program instructions for performing at least one of:

pursuant to developing the main thread scene and the first avatar, building the avatar as a reflection of a user's selected characteristics that is present in a physical world, and pursuant to enabling the creation and merger of the main thread scene with other thread scenes featuring the virtualized avatar throughout the multi-layered thread:

responding to an additional request by the avatar to build a nested branch thread layer as one of the multi-layered thread, or responding to the additional request by the avatar to merge the nested branch thread layer with the main thread scene as a main thread layer, or resolving a conflict, or merging a context in multiple ones of the other thread scenes and the other thread layers to allow the avatar to return to the main thread scene as the main thread layer.

19. The computer program product of claim 15, further comprising program instructions for:

enabling a projection of the first avatar to function as a digital stand-in, collecting and summarizing information from the main thread scene as a main thread layer, or to function and interact with other avatars in the other thread scenes as other thread layers in the multi-layered thread, enabling, in one of the other thread scenes functioning as a side thread layer of the multi-layered thread, a projection of the avatar to interact with projections of the other avatars in an experimental scene-sharing theme to test a communication methodology or a reaction with the first avatar or the other avatars, and in the side thread layer, actively terminating, by the avatar, the side thread theme to return to the main thread theme in the main thread layer, and collecting information summarized by the first avatar to successfully complete multiple thread scenes according to the predetermined methodology.

20. The computer program product of claim 15, further comprising program instructions for calling back, by a projection of the avatar in the main thread scene as a main thread layer, a further projection of the first avatar in one of the other thread scenes functioning as a side thread scene in a side thread layer by a predetermined conditioning being satisfied in the predetermined methodology.

* * * * *